(12) United States Patent
Patre et al.

(10) Patent No.: US 11,065,768 B2
(45) Date of Patent: Jul. 20, 2021

(54) AUTOMATIC CALIBRATION FOR CAMERA-ROBOT SYSTEM WITH TOOL OFFSETS

(71) Applicant: TE Connectivity Corporation, Berwyn, PA (US)

(72) Inventors: Parag Patre, Mechanicsburg, PA (US); Swapnilsinh Solanki, Harrisburg, PA (US)

(73) Assignee: TE Connectivity Services GmbH

( * ) Notice: Subject to any disclaimer, the term of this patent is extended or adjusted under 35 U.S.C. 154(b) by 386 days.

(21) Appl. No.: 16/178,420

(22) Filed: Nov. 1, 2018

(65) Prior Publication Data

US 2020/0139550 A1 May 7, 2020

(51) Int. Cl.
*B25J 9/16* (2006.01)

(52) U.S. Cl.
CPC .......... *B25J 9/1692* (2013.01); *B25J 9/1697* (2013.01)

(58) Field of Classification Search
CPC .............. B25J 9/1692; B25J 9/1697; G05B 2219/39016; G06T 7/80; G06T 7/70
See application file for complete search history.

(56) References Cited

U.S. PATENT DOCUMENTS

| | | | | |
|---|---|---|---|---|
| 10,099,380 B2 * | 10/2018 | Ishige | .................... | B25J 9/1697 |
| 10,780,585 B2 * | 9/2020 | Park | .......................... | G06T 7/80 |
| 2018/0004188 A1 * | 1/2018 | Yamaguchi | .............. | B25J 13/02 |
| 2018/0186004 A1 | 7/2018 | Park et al. | | |

FOREIGN PATENT DOCUMENTS

CN 108122257 A 7/2018

OTHER PUBLICATIONS

International Search Report, International Application No. PCT/IB2019/059376 International Filing Date, Oct. 31, 2019.

* cited by examiner

*Primary Examiner* — Robert T Nguyen

(57) ABSTRACT

A method is provided for automatically calibrating a camera-robot system having tool offsets.

9 Claims, 13 Drawing Sheets

AUTOMATIC CALIBRATION FOR CAMERA-ROBOT SYSTEM WITH TOOL OFFSETS

FIELD OF THE INVENTION

The present invention is directed to camera-robot systems. In particular, the invention is directed to calibrating vision-based guidance systems.

BACKGROUND OF THE INVENTION

Vision-based guidance systems or camera-robot systems are commonly utilized in industry. The camera acts as the sensor to the robot and 'sees' the objects of interest. However, these object locations detected by the vision system are in the camera pixel coordinates that need to be mapped to the robot coordinates so that it can execute tasks such as pick and place. This process of mapping the camera pixel coordinates to the robot coordinates (real world millimeters) is commonly referred to as hand-eye calibration or camera-robot calibration.

Moreover, as shown in FIG. 1, for a Selective Compliance Assembly Robot Arm or Selective Compliance Articulated Robot Arm ("SCARA") or human arm robot 10 having an end of arm tool 12 mounted on the robot, there is usually an X, Y offset 14 (which offset is exaggerated for purposes of illustration) between a tool center 16 of the tool 12 and the centerline of the Z-axis 18 of the robot. In order to accurately position the robot, this tool offset must also be measured and incorporated in the robot inverse kinematics by the robot controller. Both of these processes (calibration and tool offset measurement) are typically done using manual observations that involve jogging or moving the robot to known reference points and aligning as precisely as possible with the eyes. Depending on the number of measurements to be taken, this manual process can take about 60 to 100 minutes by trained operators. The manual observations can introduce errors in the calibration, and at best, a position accuracy of +/−0.2 mm is achieved, and there is no knowledge about the distribution of calibration errors across the robot workspace. Other sources of error are the unknown offsets in the tool center point, i.e., the point in relation to which all robot positioning is defined, that exist due to mechanical tolerances in the design of the robot gripper elements.

There is need in the art for improvements to camera-robot systems that minimize these drawbacks.

SUMMARY OF THE INVENTION

An object is to provide an automatic calibration process to map the camera pixels to the robot coordinates as well as calculating the unknown tool offsets.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
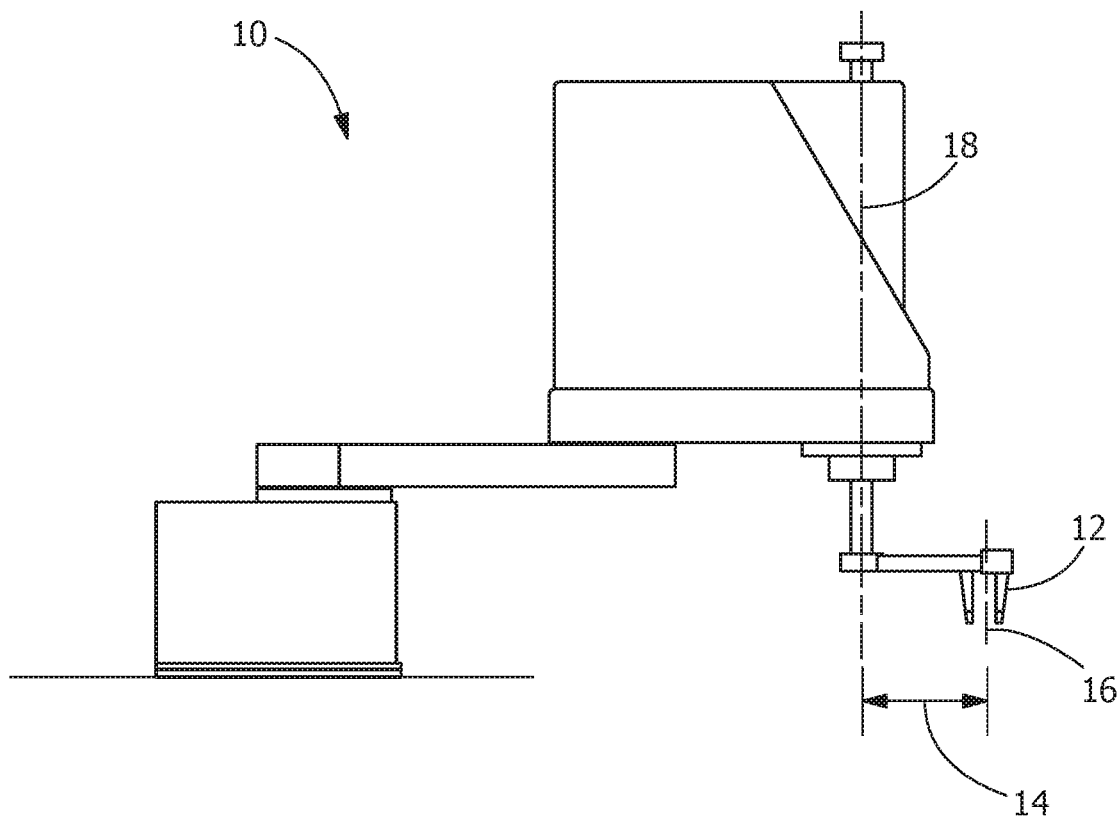
FIG. 1 shows a view of a prior art arm robot including an attached tool.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features; the scope of the invention being defined by the claims appended hereto.

The present invention includes a process, referring to FIGS. 5-11, for automatically calibrating camera-robot systems with end of arm tool or tool offsets. For example, for a camera-robot system having 3 degrees of freedom, X and Y axes and Yaw (rotation component in the XY plane; rotation about the Z axis), the automatic calibration process calibrates the robot tool point definition X, Y offsets, and also calibrates camera coordinates to robot coordinates X, Y and Yaw. For this automatic calibration process, knowledge of the tool center point ("TCP") is not required. That is, the TCP may correspond to a certain X and Y offset, and this offset is not required to be known. While mechanical design dimensions for the tool X, Y offsets may be provided, due to mechanical tolerances, these X, Y offsets are different than the "design" offsets. This calibration process automatically calculates the actual X, Y offsets.

For most conventional robot-camera calibrations, one point is accurately taught by the operator, i.e., some special fiducial will be used to align the tool center point with a known location that can be seen from the vision system. Subsequently, two additional conditions are required for the conventional calibration to work: 1) the value of pixels per mm (based on camera resolution), and 2) the pixel per mm value is constant throughout the area of interest. In reality, the camera lens distortion may exist even after camera calibration, and/or the robot itself may not have linear motions. As a result, the pixels per mm will not be a constant number everywhere in the area of interest, and may not work properly. The automatic calibration process of the present invention does not need to satisfy any of these conditions.

In summary, the proposed automatic calibration process is most suitable for applications which require precise calibration.

The terms "end of arm tool," "tool," "gripper" and the like may be used interchangeably.

The term "calibration target" refers to a part that is picked up by the robot tool and placed at various points on a grid, and then detected by the vision system. The calibration target is typically not a specially designed part, although it can be. The only requirement is that this "calibration target" should have a unique and unambiguous orientation when viewed from a predetermined vantage point, such as from a position vertically above the part. That is, when the vision system detects this part, it should have a well-defined orientation. An example is a rectangular object having one chamfered corner. Typically, the calibration target will be any of the parts for which the robotic pick and place system is being deployed. Frequently, the end of arm tool or tool is specially designed for this part.

The term "calibration target," "calibration part," "part" and the like may be used interchangeably.

The term "data point," "measurement point," "observation point" and the like may be used interchangeably.

Figure 2:
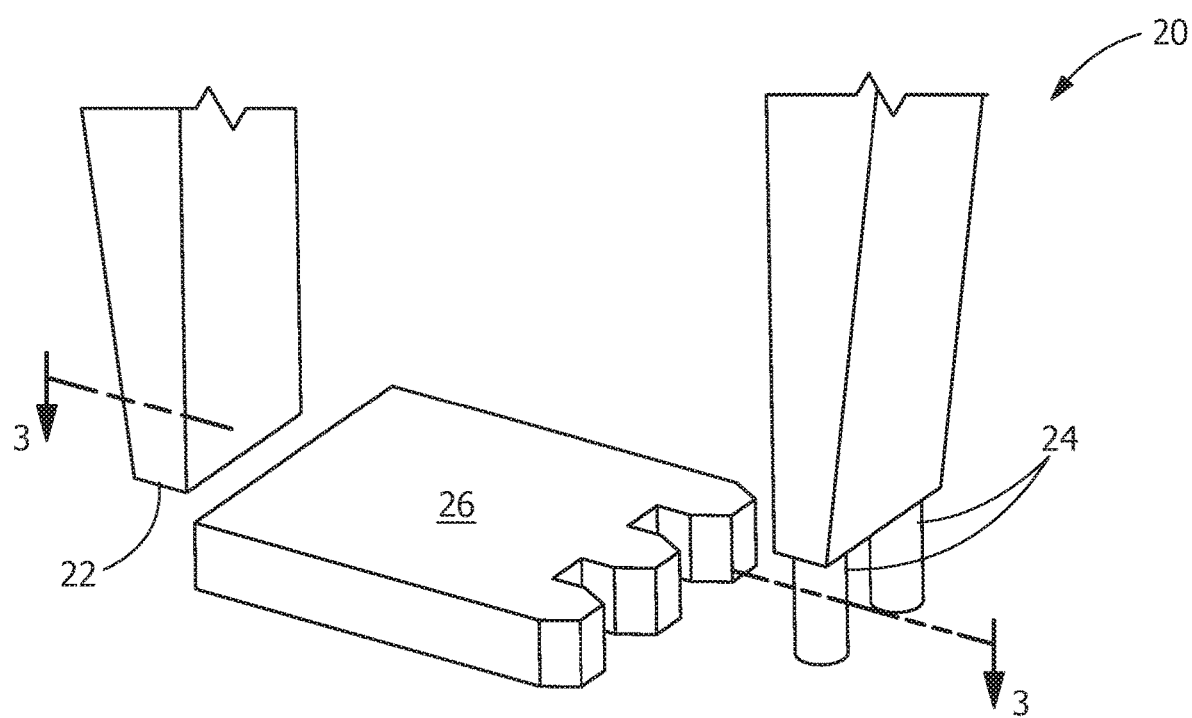
FIG. 2 shows an upper perspective view of an exemplary tool preparing to grip an exemplary calibration target.
Figure 3:
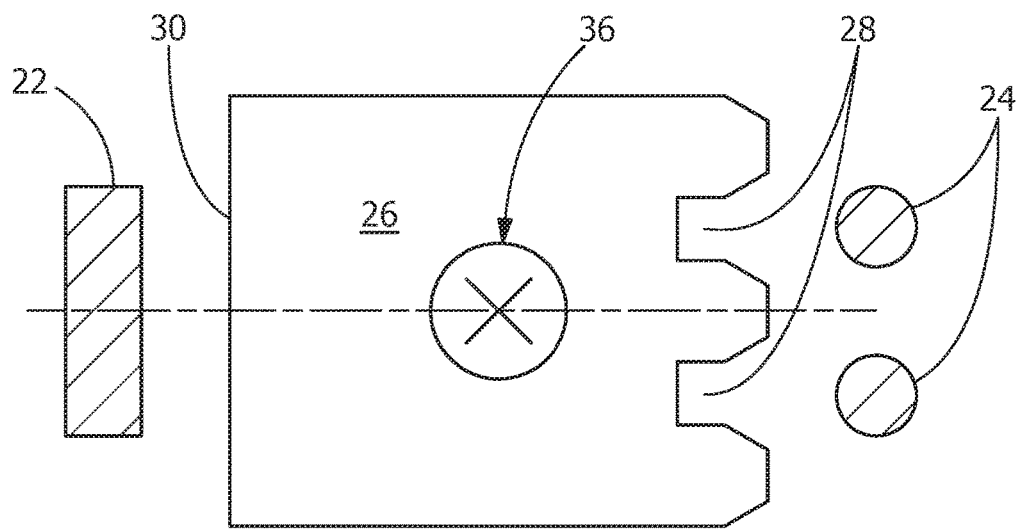
FIG. 3 shows a cross-section of the tool/calibration target taken along line 3-3 of FIG. 2.
Figure 4:
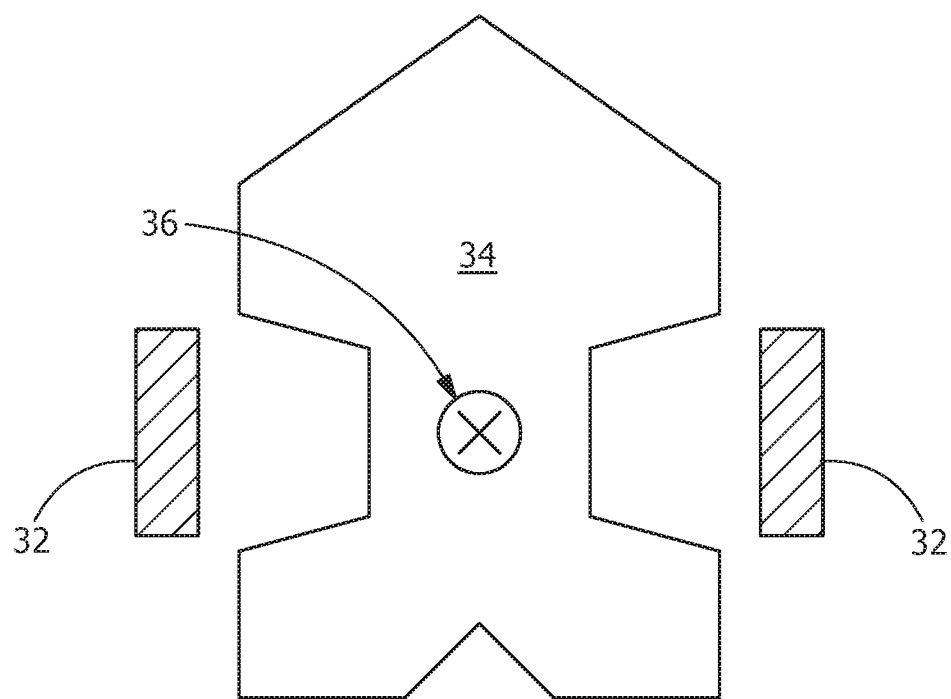
FIG. 4 shows a plan view of an exemplary tool preparing to grip an exemplary calibration target.

The calibration process "assumes" that the calibration object is released cleanly by the tool. That is, if the robot moves to a point or position, and the gripper opens, the part does not move while the gripper opens and is deposited at the exact point or position. In practice, this "clean release" may be achieved by decreasing the tool clamping force, such as by adjusting air pressure (for systems using pneumatics.) In addition, the "clean release" may be achieved by a well-designed gripper that offers mechanical centering while grasping the parts. For example, as shown in FIGS. 2 and 3, a gripper 20 includes gripper portions 22, 24 that are specifically designed for part 26, which part 26 is the same as the other parts to be picked and placed by the robot. If there is a predetermined relative offset in X, Y and yaw (to be designated as "u"), upon the gripper moving to a closed position, the part is both squared and centered between the jaws of the gripper. Therefore, irrespective the orientation of the part prior to being grasped, upon the part being grasped, the pose of the part is always fixed. The term "pose" is defined as the position and orientation of a part relative to a coordinate system. In this instance, the locating pins of gripper portions 24 are brought into contact with corresponding features 28 of part 26, with the opposed finger of gripper portion 22 being brought into contact with a flat feature 30 of part 26 for providing support. FIGS. 2 and 3 represents an instance in which the gripper is specifically designed for parts to provide centering. However, if a generic gripper 32 is to be used with parallel jaws, such as shown in FIG. 4, a special calibration target 34 can be designed. In this case, upon the gripper moving to a closed position, the calibration target will always have the same pose. The vision system will identify the point corresponding to a tool center point ("TCP"), such as TCP 36 for respective part 26 in FIG. 3 and calibration target 24 in FIG. 4.

For purposes of clarification, as further shown in FIG. 1, the centerline Z axis 18 of the robot corresponds to a "tool 0" or "default tool." That is, when robot coordinates in the default tool are referred to, those coordinates correspond to this point, and these robot coordinates are always known to use at any point in space through the robot software. This is where the robot thinks it is. The actual useful tool could be mounted at an offset Tx, Ty (which is assumed to be unknown or not precisely known) and is designated as "tool 1." In addition to calibration parameters, these unknown tool offsets are also calculated from this auto-calibration method or process. If any parts are detected by the vision system, then these parts need to be picked up using the tool 1.

Underlying Mathematics of Auto-Calibration

The relation between the vision coordinates, robot coordinates and the tool offsets is described as follows in equation 1

$$\text{Poly}(Cx,Cy)=[Rx;Ry]+\text{Rot}(Ru)*[Tx;Ty] \quad [1]$$

The following are known quantities:
Cx, Cy=camera pixel location along camera x, and y axes
Rx, Ry=robot X and Y coordinates in tool 0 (the centerline of tool flange or default tool)
Ru=robot yaw (u) in degrees (tool 0)

The following are unknown quantities:
Tx, Ty=unknown tool point offset with respect to the centerline of the Z-axis.
Poly=is the polynomial fit of desired order.
Rot(Ru) represents the rotation matrix around the Z axis for a given angle Ru.

The polynomial fit 'Poly' can be of any desired order depending on the nature of application and the nonlinearities present in the manipulator and sensor. Typically, model order from 1 to 5 can be examined for a suitable fit. A polynomial of order 1 in Cx and Cy is of the form $(mx_1*Cx+ny_1*Cy+o_0)$ where the coefficients m, n, o are the unknowns to be determined. The number of measurements required to solve the above equation using least squares can be calculated based on the model order of polynomial fit being considered. For example, for model order 1, there will be total 8 unknowns, including the two tool offset parameters. Since, each measurement provides two equations (one for X and one for Y), at least four measurements will be required.

The equation above maps the X, Y pixel locations to their corresponding locations in the robot coordinates. In a similar manner, the object orientation in the camera coordinates can be related to the corresponding orientation in the robot coordinates.

Calibration: Linear Case (n=1)

For a first observation or measuring point, $$\begin{pmatrix} Cx_1 \\ Cy_1 \end{pmatrix} \leftrightarrow \begin{pmatrix} Rx_1 \\ Ry_1 \end{pmatrix}$$

$Cx_1$ and $Cy_1$ correspond to a vision coordinate in camera space, and $Rx_1$ and $Ry_1$ correspond to a robot coordinate at the same physical location in the robot's tool 0 or default tool, which are known values. Utilizing equation 1 results in "linear fit" equation 2:

$$\begin{bmatrix} m_1 * Cx_1 + n_1 * Cy_1 + o_1 \\ m_2 * Cx_1 + n_2 * Cy_2 + o_2 \end{bmatrix} = \begin{bmatrix} Rx_1 \\ Ry_1 \end{bmatrix} + \begin{bmatrix} \cos u_1 & -\sin u_1 \\ \sin u_1 & \cos u_1 \end{bmatrix} * \begin{bmatrix} Tx \\ Ty \end{bmatrix} \quad [2]$$

in which the right-hand side of the equation corresponds to the physical position of the TCP of the robot. In equation 2, there are eight unknown quantities: $m_1$, $n_1$, $o_1$, $m_2$, $n_2$, $o_2$, Tx, Ty. Therefore, for the linear case, at least four observation points are required, because each observation gives two equations. The linear fit equation 2 is now rearranged as equation 3 as follows:

$$\begin{bmatrix} m_1 * Cx_1 + n_1 * Cy_1 + o_1 - Tx * \cos u_1 + Ty * \sin u_1 \\ m_2 * Cx_1 + n_2 * Cy_1 + o_2 - Ty * \sin u_1 - Tx * \cos u_1 \end{bmatrix} = \begin{bmatrix} Rx_1 \\ Ry_1 \end{bmatrix} \quad [3]$$

Taking additional observation points and separating as a product of matrices yields equation 4

$$\begin{bmatrix} Cx_1 & Cy_1 & 1 & 0 & 0 & 0 & -\cos u_1 & \sin u_1 \\ 0 & 0 & 0 & Cx_1 & Cy_1 & 1 & -\sin u_1 & -\cos u_1 \\ & & & \vdots & & & & \\ & & & \vdots & & & & \\ Cx_n & Cy_n & 1 & 0 & 0 & 0 & -\cos u_n & \sin u_n \\ 0 & 0 & 0 & Cx_n & Cy_n & 1 & -\sin u_n & -\cos u_n \end{bmatrix} \begin{bmatrix} m_1 \\ n_1 \\ o_1 \\ m_2 \\ n_2 \\ o_2 \\ Tx \\ Ty \end{bmatrix} = \begin{bmatrix} Rx_1 \\ Ry_1 \\ Rx_2 \\ Ry_2 \\ \vdots \\ \vdots \\ Rx_n \\ Ry_n \end{bmatrix} \quad [4]$$

which can be solved using least squares standard algorithms. As previously noted this is a linear fit example only. Higher-order fit equations formulated in a similar manner.

For example, for each order fit, there are certain unknown coefficients, as well as the unknown tool offsets Tx, Ty. For a second order fit (n=2), there will be 14 unknowns including Tx, Ty. For order n=3, there are 22 unknown variables. The number of unknown variables needing to be solved for each corresponding order number ("N") equation is as follows:

Number of points=$(N)^2+(3*N)+4$ with the number of observation or measuring points equaling the number of variables divided by 2.

An Exemplary Set-Up for the Calibration Process

Figure 5:
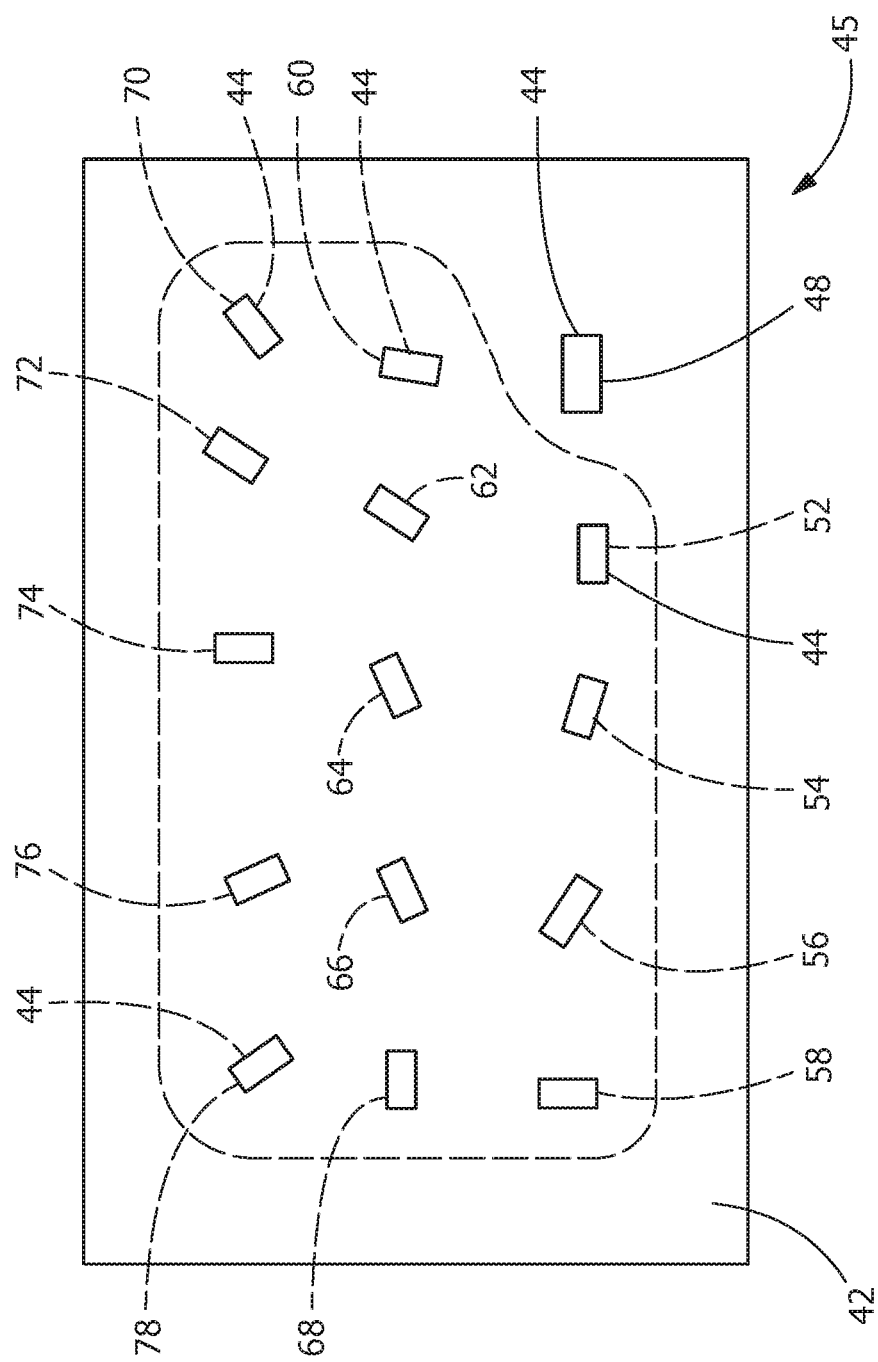
FIG. 5 shows an exemplary arrangement of calibration target measuring points for the calibration operation.
Figure 6:
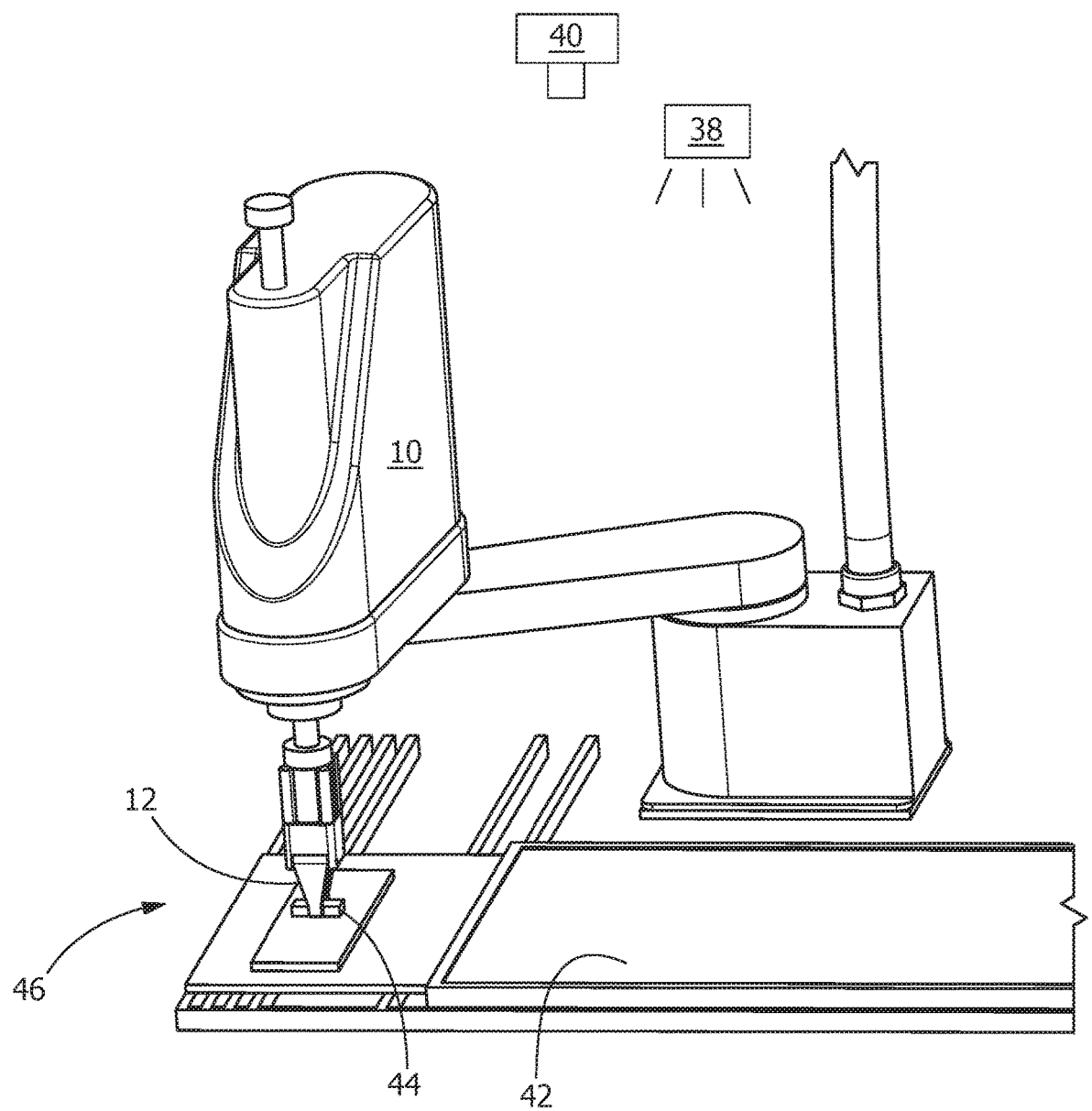
FIGS. 6-8 show sequential steps in the operation of calibrating a camera-robot system with tool offsets.
Figure 9:
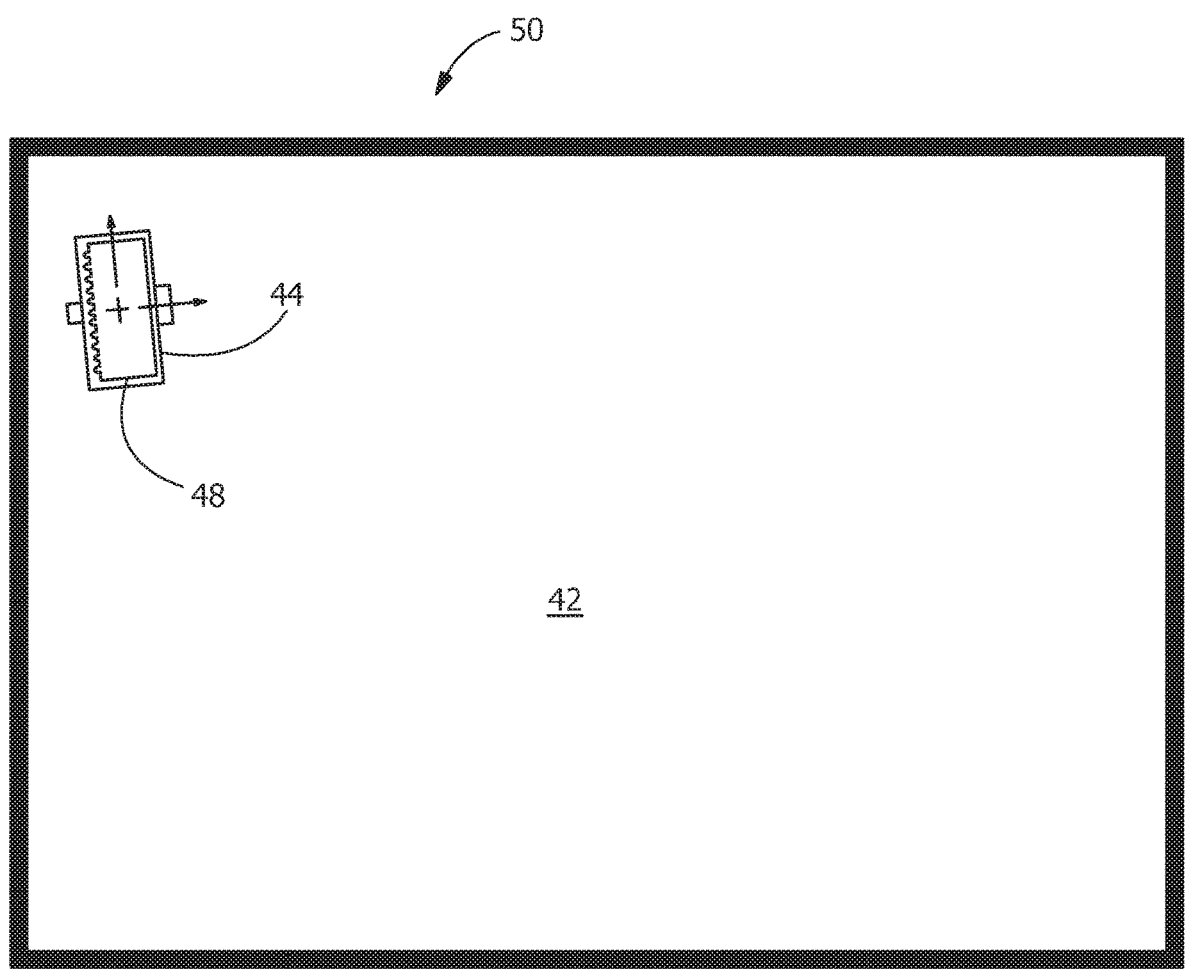
FIG. 9 shows an exemplary camera-captured image of a calibration target.
Figure 10:
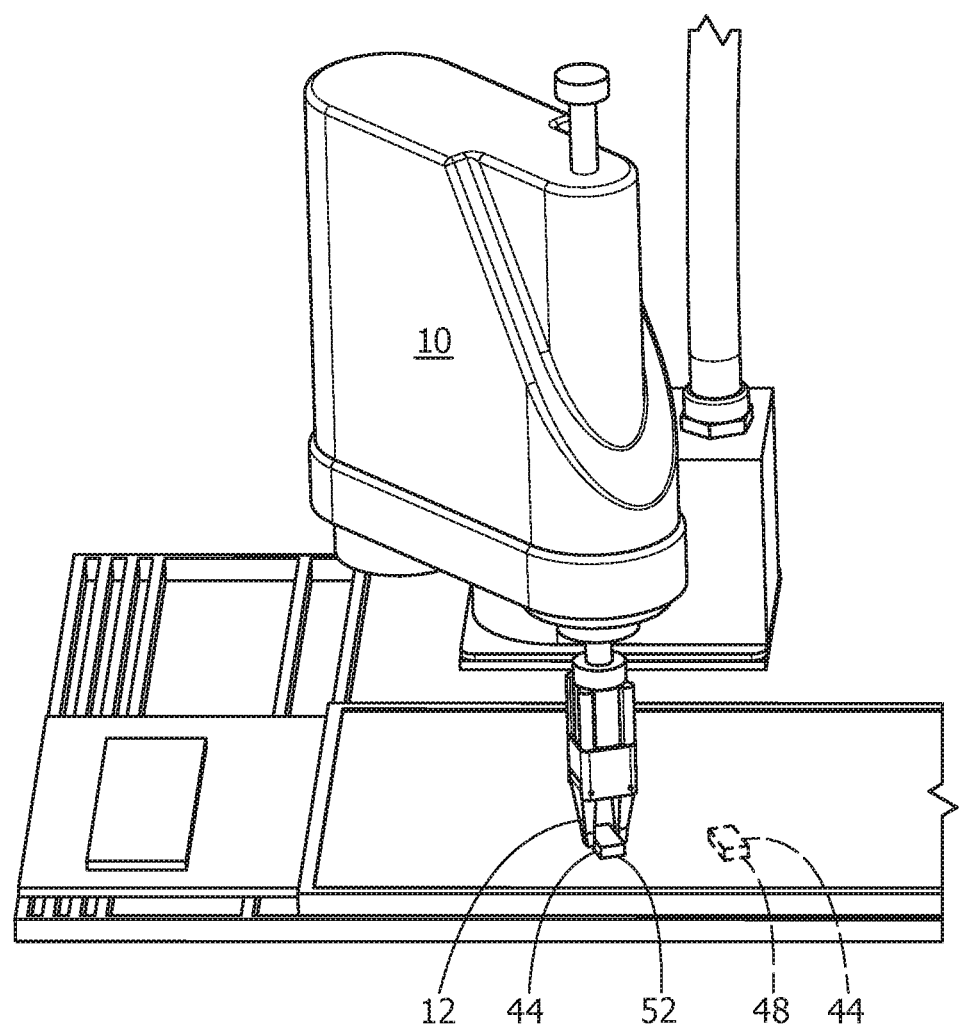
FIG. 10 shows a sequential step in the operation of calibrating a camera-robot system with tool offsets.
Figure 11:
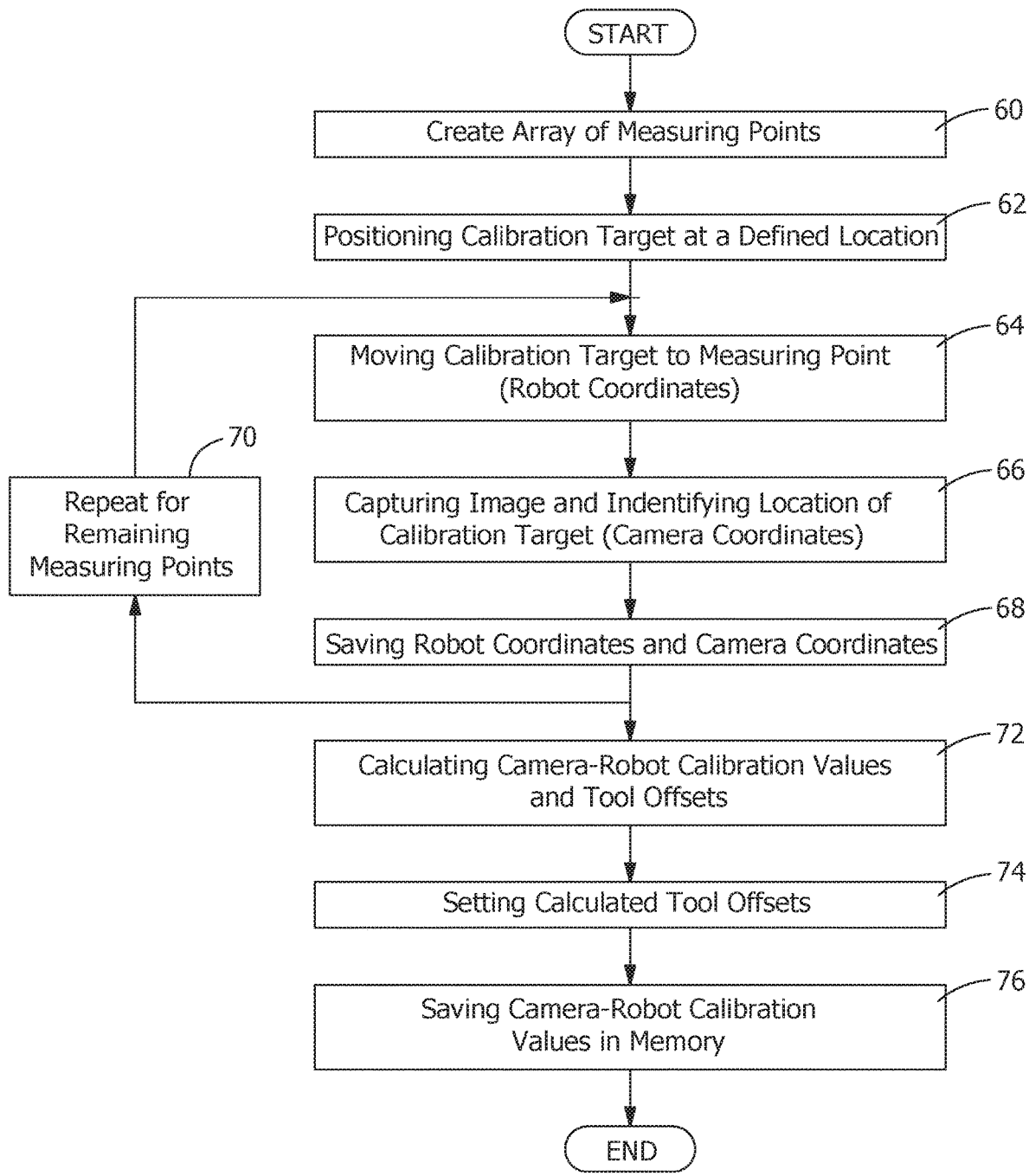
FIG. 11 shows a diagram of an exemplary process of calibrating a camera-robot system with tool offsets.

FIGS. 5-10 are directed to an exemplary set-up for practicing the calibration process of the present invention, with FIGS. 5-8 and 10 showing sequential steps in the operation of calibrating a camera-robot system with tool offsets. FIG. 11 shows a process diagram corresponding with the operation of the calibration process of the present invention. As shown in FIG. 5 (and step 60 of FIG. 11), a set-up for the calibration process includes setting up or creating a grid or array 45 of calibration targets 44 at a plurality of observation or data or measuring points, such as measuring points 48, 52, 54, 56, 58, 60, 62, 64, 66, 68, 70, 72, 74, 76 78. The number of measuring points to collect, the spacing between them (uniform spacing or non-uniform spacing), and also regions where the measuring points, such as on work surface 42, are defined or initially determined by an operator during a "set-up" mode of the robot. Work surface 42 is shown as a generally planar surface in FIG. 5, such as in two-dimensional, e.g., X, Y coordinates. That is, measurement positions need to be on the same plane (fixed Z plane), although they can be non-uniformly spaced relative to each other, and they should be within the camera field of view ("FOV"). Minor variations in Z coordinates due to surface leveling, finish, etc. are permissible. If this calibration method is extended where a three-dimensional ("3D") camera is used, then the measurement points can be anywhere in 3D space. That is, when using 3D cameras, the only requirement for the measuring points is that they must be located within a predetermined region or field of view of camera 40 (FIG. 6).

Since positioning of the measuring points is done during the set-up mode only, during regular operation, once these observation or measurement points have been defined, the operator does not have to re-define them. The data or measurement points do not need to be collected in a rectangular grid. If, for example, the area of interest is a circle sector (pie), then observations will be collected accordingly. The way the observations are collected (where and how many) generally depends on: 1) the shape of area of interest, and 2) root mean squared ("RMS") error between the "real data" which is the actual location of the measuring points in robot coordinates, and the data estimated from the fit or by calculation of values from the calibration equation, as will be discussed in additional detail below.

As shown in FIG. 6, a set-up for the calibration process includes robot 10 having an end of arm tool or tool 12, an illumination source 38, a camera 40 and a work surface 42. FIG. 6 further shows tool 12 picking up calibration target 44 from a nest 46. The location of nest 46 is a defined location known to the robot and must be manually taught to position calibration target 44 at the defined location (step 62 of FIG. 11). In one embodiment, the nest is a defined location in a default tool position. The robot is jogged or moved to nest 46 while the robot is in a "teach" mode and the point being saved in memory of the camera-robot system by the operator. However, this manually taught point is only approximate—but precise enough that when the robot goes there, the object will be grasped by the tool properly. It is at this point that the mechanical centering property of the gripper or tool, as previously discussed, is applicable. Even though the initial grasp location of the tool at the nest is approximate, the gripper or tool makes sure that on grasp, the part self-centers relative to the tool. Even though the exact tool center is unknown, but because the tool is mounted on the robot, the operator can see and position the tool with sufficient proximity or accuracy in order to grasp the object. Since the robot teach mode and self-centering of a calibration target relative to the tool are both well known to those having ordinary skill in the art, no additional discussion is provided.

Figure 7:
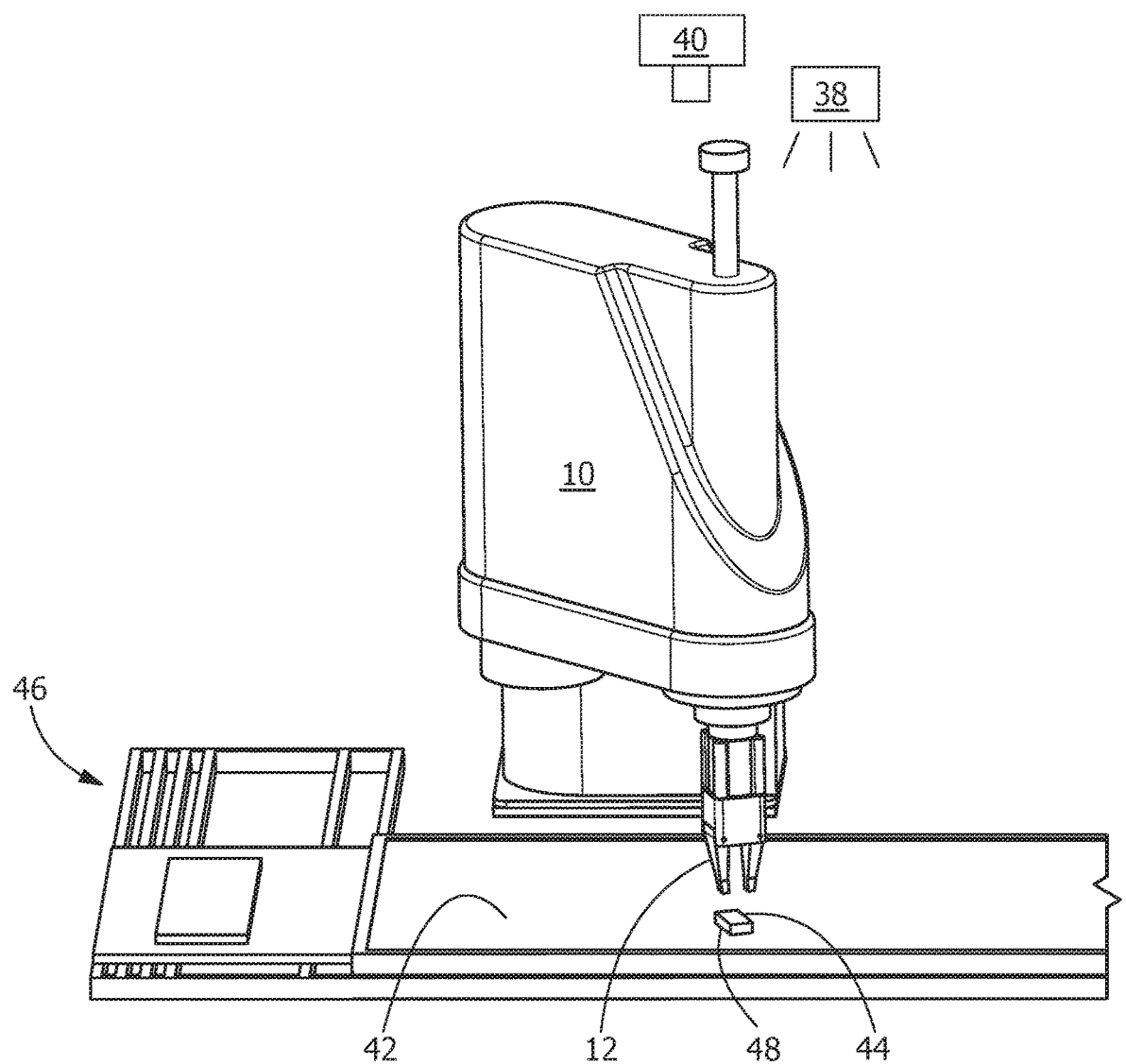

As shown in FIG. 7 (and step 64 of FIG. 11), tool 12 of robot 10 moves calibration target 44 from the defined location of nest 46 to measuring point 48. Measuring point 48 corresponds to robot coordinates of a default TCP in a robot base coordinate system which is a known location.

Figure 8:
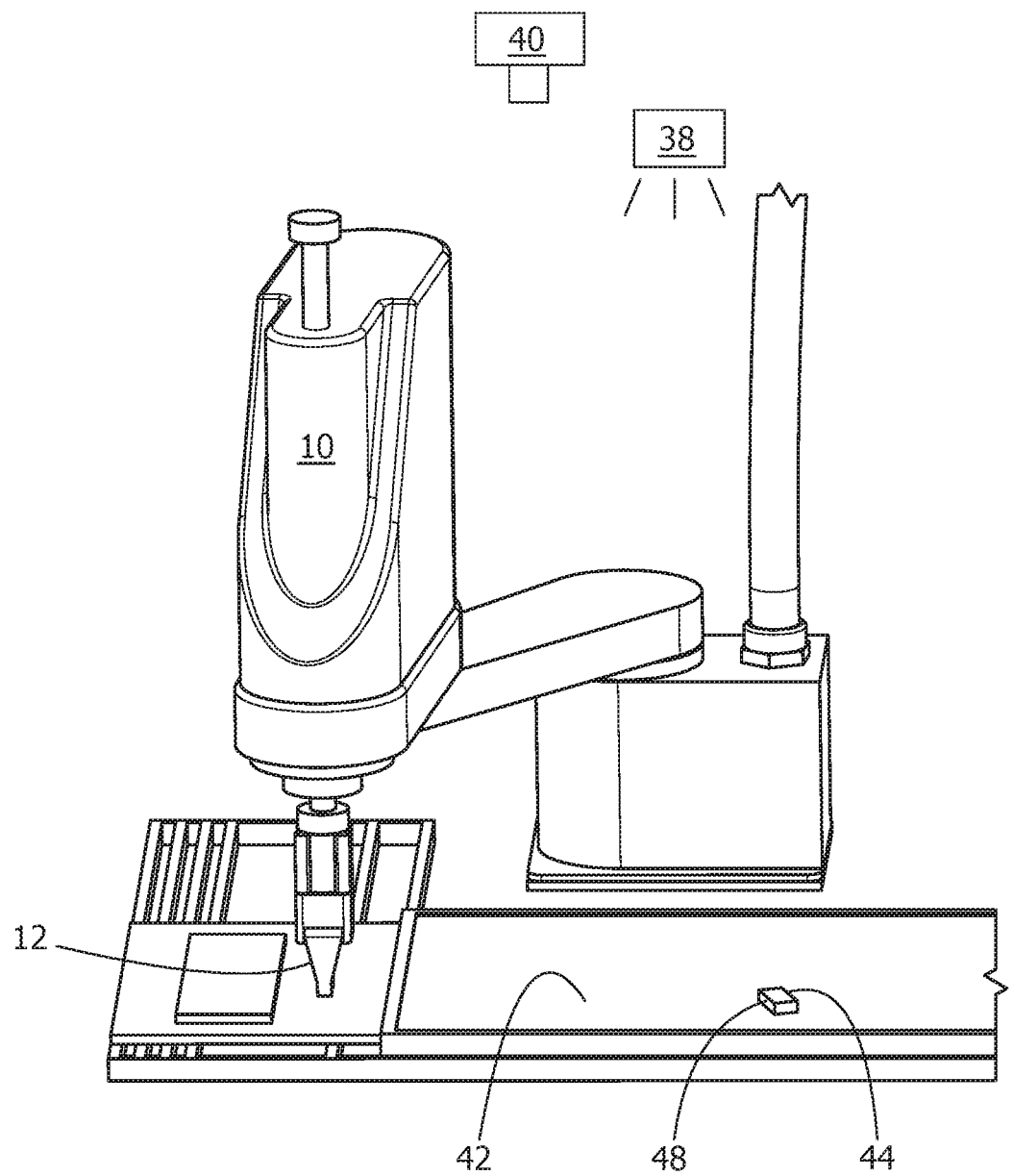

Once calibration target 44 has been placed at measuring point 48, as shown in FIG. 8, robot 10 moves away from calibration target 44. More specifically, robot 10 moves sufficiently away from calibration target 44 such that camera 40, which is part of the vision system, with illumination provided by illumination source 38, captures an image of calibration target 44 (step 66 of FIG. 11). FIG. 9 shows an exemplary camera-captured image 50 of calibration target 44. In addition, the vision system detects or identifies a location of calibration target 44 in camera coordinates (also a portion of step 66 of FIG. 11). Not only does the location identify the position of the calibration target, but also an orientation parameter relative to the defined location, such as the angular orientation, such as yaw (rotation about a Z axis) as previously discussed. It is to be understood that in a 3D space, additional rotational orientations, such as roll and/or pitch may need to be measured, which would require additional sensing equipment. In this scenario, a 6 degree-of-freedom or higher robot manipulator can be used. The operation of vision systems for robots is well known and not further discussed herein.

Once camera 40 has captured the image and identified the location of calibration target 44 as discussed for FIG. 9 (and step 66 of FIG. 11), the robot coordinates and camera coordinates are saved to a memory in the camera-robot system in a manner that is well known (step 68 of FIG. 11). Once the coordinates are saved to memory, as shown in FIG. 10, tool 12 of robot 10 moves calibration target 44 from measuring point 48 to a measuring point 52. Once calibration target 44 has been placed at measuring point 52, as shown in FIG. 10, robot 10 moves away from calibration target 44, the image is captured and location identified for the calibration target as previously discussed. It is appreciated that calibration target 44 is then placed in each remaining measuring point of the grid or array as shown in FIG. 5, with the vision system capturing the images and identifying the location of calibration target 44 for those measuring points. Stated another way, after step 68 of FIG. 11 is performed, performing step 70 of FIG. 11 entails repeating steps 64, 66 and 68 for each remaining measuring point.

Once all robot coordinates and camera coordinates have been saved in a memory, as shown in step 72 of FIG. 11, camera-robot calibration values and the tool offsets are calculated according to the following equation:

$$\text{Poly}(C_x, C_y) = [R_x; R_y] + \text{Rot}(R_u) * [T_x; T_y]$$

such as for a first order equation, as previously discussed.

Once the camera-robot calibration values and the tool offsets have been calculated, in step 74 of FIG. 11, the calculated values for the tool offsets are set or input into the robot, and in step 76 of FIG. 11, the camera-robot calibration values are saved to memory.

The automatic calibration process of the present invention provides several noteworthy advantages over manual calibration. For example, a skilled operator may require 180-300 seconds to manually position the robot tool, versus 2-3 seconds with the automatic calibration process. This represents a time improvement factor of approximately 100 times. Similarly, the accuracy of manual operations of a skilled operator is limited to +/−0.2 mm, versus +/−0.05 mm with the automatic calibration process. This represents an accuracy improvement factor of approximately 4 times. The calibration error of +/−0.05 mm is achieved when the robot repeatability is +/−0.01 mm and a 5 megapixel ("MP") camera is used. Additionally, skilled operators are required for manual calibration, while only push-button operation is required with the automatic calibration process.

Figure 12:
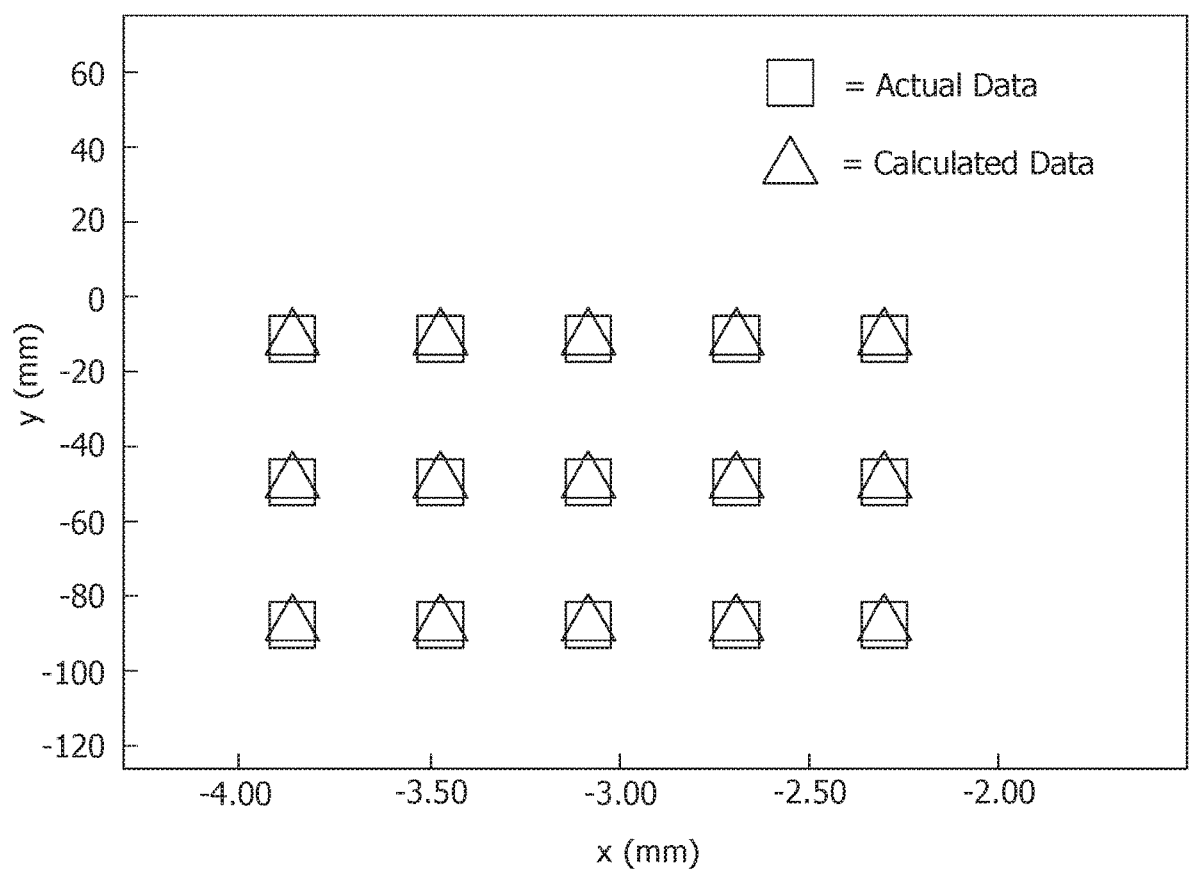
FIG. 12 shows a graphical representation of differences between actual and calculated robot coordinate values. This plot shows X and Y coordinates, units are mm.
Figure 13:
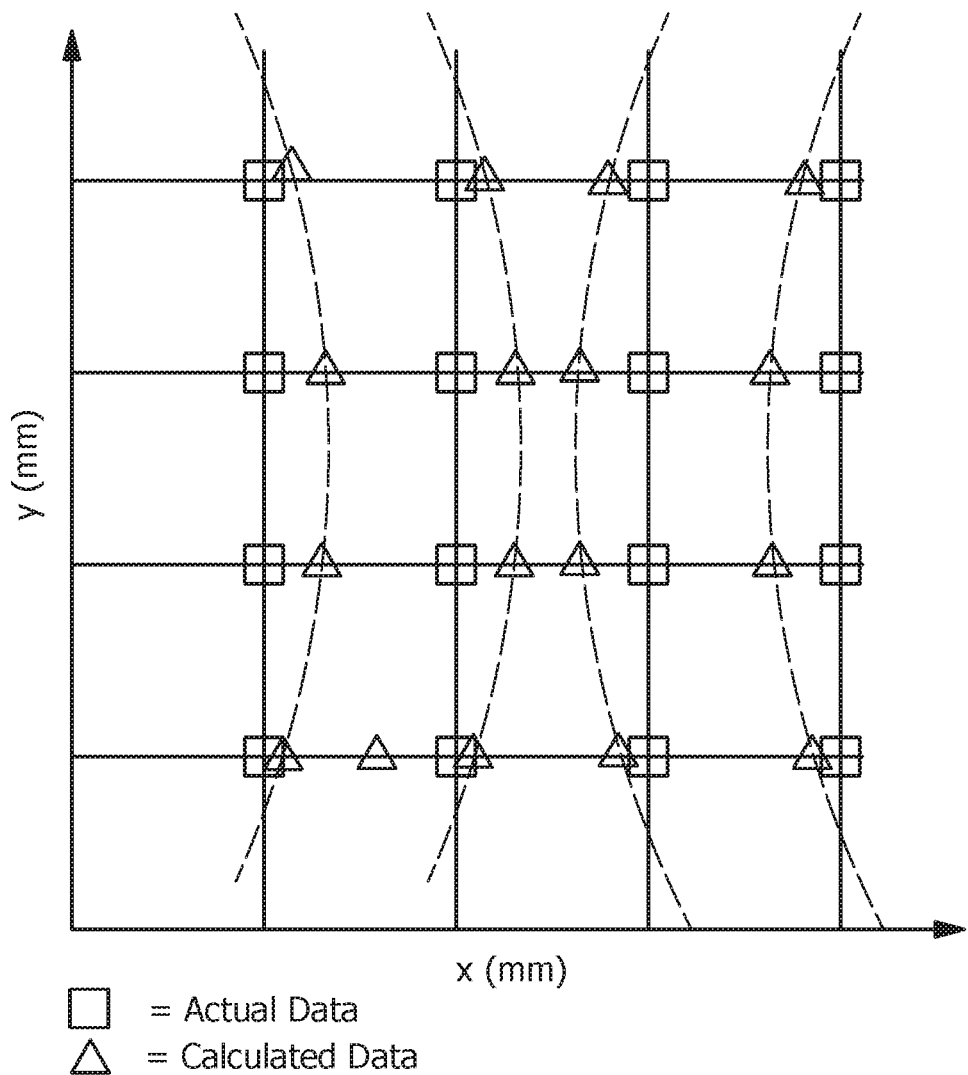
FIG. 13 shows a graphical representation of differences between actual and calculated robot coordinate values for determining linearity of the values. This plot shows X and Y coordinates, units are mm.

To help ensure the enhanced accuracy of the automatic calibration process is achieved, as shown in FIG. 12, actual data, i.e., the robot coordinates are compared to calculated data, i.e., calculated coordinates obtained from the calibration equation, as previously discussed. In addition, it is preferable that linearity of the actual data is compared to the calculated data. If there is non-linearity, more data or measurement points would need to be taken, and the calibration equation solved to incorporate the additional measurement points. An error distribution between calculated data and actual data is shown in FIG. 13, for an exemplary XY plot for a non-linear fit.

Linearity, non-linearity or the need for additional measurement points can be established as follows:

For the X,Y plot showing calibration errors for a linear fit (e.g., FIG. 12), if all the plotted points of actual data and calculated data are generally equally close to each other, as well as the RMS calibration error being within "acceptable" range, then it can be concluded that a linear fit is sufficient for the application. "Acceptable" range of error depends on the application, such as, for example, typically under 0.2 mm. However, if it is observed that one or more of the observations points show a greater deviation between actual and calculated data compared to the rest of the points on the plot, as well as the calibration error being above the acceptable range, this indicates nonlinearity either in the robot or the camera. If a larger than others deviation is observed in few of the points compared to others, but the calibration RMS error is still within acceptable range, one can still use a linear fit.

From above, if it is determined that a higher order fit is required (model order 2 or higher), then plots similar to FIG. 12 can be observed for higher order fits. Again, all data points can be checked if they are relatively equally close when comparing actual and calculated data. If not, even higher fit equation can be chosen until the actual and calculated data "fit".

Figure 14:
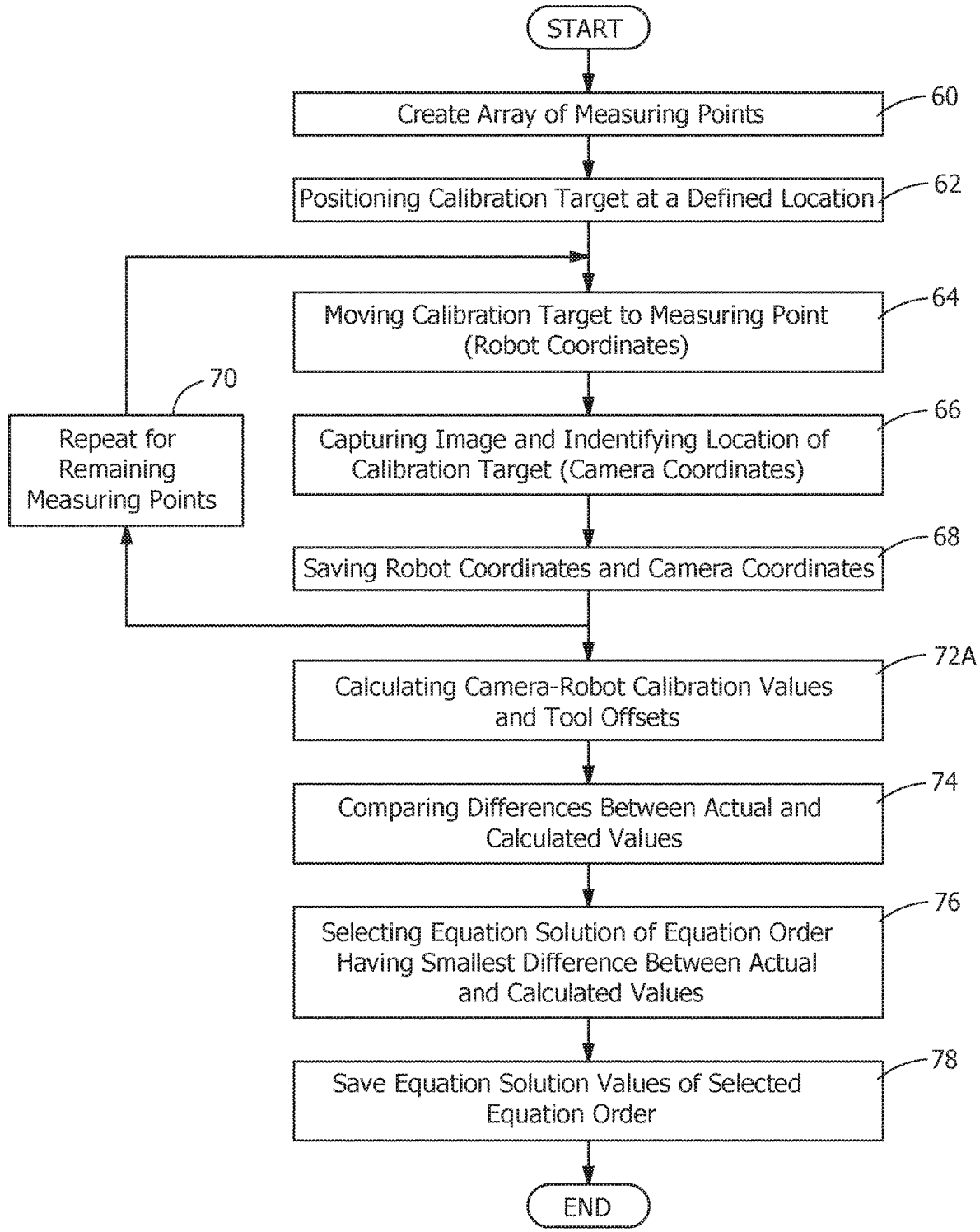
FIG. 14 shows a diagram of an exemplary process of calibrating a camera-robot system with tool offsets.

As shown in FIG. 14, which is similar to FIG. 12, step 72A includes calculating camera-robot calibration values in tool offsets for numerous orders N of the equation, such as 1-5, or up to the Nth order for which a sufficient number of observation or measurement points were taken. For example, as noted above, for a first order of the equation, at least 4 data or measurement points are required, preferably more. In step 74 of FIG. 14, the differences between actual and calculated values for each order of the equation are compared, and in step 76 of FIG. 14, the equation solution of the equation order having the smallest differences between the actual values and the calculated values of the robotic coordinates is selected. In step 78 of FIG. 14, the equation solution values of the selected equation order are saved in memory. In one embodiment, in step 74, only the differences between the actual and calculated values for the first order equation are compared, and when the differences are less than a predetermined number, the equation solution of the first order equation is used and saved to memory, without further calculation of other orders of the equation. In one embodiment, in step 74, only the differences between the actual and calculated values for the first and second order equations are compared, and in step 76, the equation solution of the first order equation and second order equation having the lesser difference values, and in step 78, the equation solution values of the selected order equation is saved to memory. In one embodiment, when the solution of more than one equation order yields differences between the actual and calculated values that are less than a predetermined value, the equation order selected is the equation order having the lowest number.

While the invention has been described with reference to a preferred embodiment, it will be understood by those skilled in the art that various changes may be made and equivalents may be substituted for elements thereof without departing from the spirit and scope of the invention of the invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

What is claimed is:

1. A method for automatically calibrating a camera-robot system having tool offsets, comprising:
   creating an array having a plurality of measuring points for collecting observations in a robot workspace and a predetermined region of a camera;
   positioning a calibration target at a defined location;
   moving, by a robot, the calibration target from the defined location to a first measuring point, the first measuring point corresponding to first robot coordinates of a default tool center point in a robot base coordinate system;
   capturing, by a camera, an image of the calibration target and identifying a location of the calibration target at the first measuring point, the location at the first measuring point corresponding to first camera coordinates;
   saving the first robot coordinates and the first camera coordinates of the calibration target in a memory;
   moving, by the robot, the calibration target from the first measuring point to the second measuring point, the second measuring point corresponding to second robot coordinates of the default tool center point in the robot base coordinate system;
   capturing, by the camera, an image of the calibration target and identifying a location of the calibration target at the second measuring point, the location at the second measuring point corresponding to second camera coordinates;
   saving the second robot coordinates and the second camera coordinates of the calibration target in the memory;
   repeating moving, by the robot, the calibration target to each of the remaining measuring points of the plurality of measuring points, capturing the image of the calibration target at each remaining measuring point and identifying a location of the calibration target corresponding to each remaining measuring point, and saving corresponding robot coordinates and camera coordinates in the memory;
   calculating camera-robot calibration values and the tool offsets according to the following equation:

$Poly(Cx,Cy)=[Rx,Ry]+Rot(Ru)*[Tx,Ty]$, wherein;

Cx, Cy=camera pixel location along camera x, and y axes;
   Rx, Ry=robot X and Y coordinates in the default tool;
   Ru=robot yaw (u) in degrees;
   Tx, Ty=unknown tool point offset with respect to a centerline of a Z axis of the robot;
   Poly=a polynomial fit of desired order; and
   Rot(Ru) represents a rotation matrix around the Z axis for a given angle Ru;
   setting the calculated tool offsets; and
   saving the camera-robot calibration values in the memory.

2. The method of claim 1, wherein positioning the calibration target at a defined location includes the robot moving the calibration target from a defined location in a default tool position.

3. The method of claim 1, wherein creating the array includes creating a uniform array.

4. The method of claim 1, wherein creating the array includes creating a non-uniform array.

5. The method of claim 1, wherein identifying a location of the calibration target at each measuring point includes identifying an orientation parameter relative to the defined location.

6. The method of claim 1, wherein subsequent to calculating the tool offsets, the method further comprises:
   comparing differences between actual values and calculated values of the robot coordinates for the at least two different orders of the equation; and
   selecting an equation solution of the equation order having the smaller differences between the actual values and calculated values of the robot coordinates.

7. The method of claim 1, wherein calculating the tool offsets includes calculating the tool offsets and the camera-robot calibration values of a first order of the equation and further comprises:
   comparing differences between actual values and calculated values of the robot coordinates for the first order of the equation; and
   saving in the memory the camera-robot calibration values of the first order of the equation when the differences are within a preselected range.

8. The method of claim 1, wherein subsequent to calculating the tool offsets, the method further comprises:
   comparing differences between actual values and calculated values of the robot coordinates for a first order of the equation with a preselected range;
   calculating the tool offsets and the camera-robot calibration values of a second order of the equation when the differences are not within the preselected range for the first order of the equation;
   comparing differences between actual values and calculated values of the robot coordinates for the second order of the equation with the preselected range;
   saving in the memory the camera-robot calibration values of the second order of the equation when the differences are within the preselected range.

9. The method of claim 8 further comprising after the saving in the memory:
   repeating the calculating and comparing steps for incrementally larger orders of the equation until differences between actual values and calculated values of the robot coordinates for the incrementally larger order of the equation are within the preselected range; and
   saving in the memory the camera-robot calibration values of the incrementally larger order of the equation.

* * * * *